US008249117B2

(12) United States Patent
Kapoor et al.

(10) Patent No.: US 8,249,117 B2
(45) Date of Patent: Aug. 21, 2012

(54) DYNAMIC ADJUSTMENT OF REORDERING RELEASE TIMER

(75) Inventors: Rohit Kapoor, San Diego, CA (US); Siddharth Mohan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 12/643,496

(22) Filed: Dec. 21, 2009

(65) Prior Publication Data

US 2011/0149919 A1 Jun. 23, 2011

(51) Int. Cl.
*H04J 3/00* (2006.01)
(52) U.S. Cl. .................................. 370/521; 370/350
(58) Field of Classification Search .................. 370/336, 370/350, 520, 521
See application file for complete search history.

(56) References Cited

U.S. PATENT DOCUMENTS 6,377,931 B1 * 4/2002 Shlomot ....................... 704/503
2011/0267999 A1 * 11/2011 Kuwahara ..................... 370/310

* cited by examiner

*Primary Examiner* — Phuc Tran
(74) *Attorney, Agent, or Firm* — Darren M. Simon

(57) ABSTRACT

Aspects describe dynamically adjusting a reordering release timer to mitigate latency in a MAC-hs queue. Information already available at a mobile device is utilized for current packets and for missing packets to dynamically adjust the value of the T1 timer in an effort to mitigate latency. Further, the network might provide information regarding HARQ attempts, which mobile device can utilize for computing the dynamic value of the T1 timer. The network might signal the amount of time the mobile device should subtract from timer T1 for every HARQ transmission. Further, the T1 timer might only be dynamically adjusted for a subset of radio bearers.

23 Claims, 11 Drawing Sheets

DYNAMIC ADJUSTMENT OF REORDERING RELEASE TIMER

BACKGROUND

I. Field

The following description relates generally to wireless communications and more particularly to dynamically adjusting a reordering release timer.

II. Background

Wireless communication systems are widely deployed to provide various types of communication and to communicate information regardless of where a user is located (e.g., inside or outside a structure) and whether a user is stationary or moving (e.g., in a vehicle, walking). For example, voice, data, video, and so forth can be provided through wireless communication systems. A typical wireless communication system, or network, can provide multiple users access to one or more shared resources. A system can use a variety of multiple access techniques such as Frequency Division Multiplexing (FDM), Time Division Multiplexing (TDM), Code Division Multiplexing (CDM), Orthogonal Frequency Division Multiplexing (OFDM), Third Generation Partnership Project (3GPP) Long Term Evolution (LTE), and others.

Generally, wireless multiple-access communication systems can simultaneously support communication for multiple mobile devices. Each mobile device can communicate with one or more base stations through transmissions on forward and reverse links. The forward link (or downlink) refers to the communication link from base stations to mobile devices, and the reverse link (or uplink) refers to the communication link from mobile devices to base stations. Further, communications between mobile devices and base stations can be established through single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Packets, identified by a sequence number, can be sent from a network to a mobile device. If a packet is dropped (e.g., not received by mobile device), the drop is recognized by mobile device because there is a hole (or missing portion) in the sequence. However, this dropped packet is not detected until a next packet is received and decoded, which is when a reordering release timer is started. After expiration of the reordering release timer, if the lost packet is not successfully received and decoded, the next packet or packets that was/were received and decoded (which triggered the timer) is sent to the upper layers. Waiting for expiration of the reordering release timer in this manner can create delays, which can negatively influence a user experience.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with dynamic adjustment of a high-speed medium access control reordering release timer. In an aspect, a reordering release timer interval can be shortened as a function of a number of hybrid automatic repeat request transmissions.

An aspect relates to a method that includes determining a first packet was not received, wherein the determining comprises receiving and decoding a second packet (or subsequent packets). Method also includes ascertaining a transmission attempt number for second packet and calculating a timer value as a function of a minimum Inter Transmission Time Interval signaled through a Radio Resource Configuration message, a parameter (which can be signaled through a Radio Resource Configuration message), and the transmission attempt number. Further, method includes passing second packet (or subsequent packets) to upper layers based on the timer value. In accordance with some aspects, method includes reading the parameter signaled though the Radio Resource Configuration message before calculating the timer value, wherein the parameter signaled is a static timer value.

Another aspect relates to a wireless communications apparatus comprising a memory and a processor. Memory retains instructions related to deciding a first packet has been lost in a network and determining a Hybrid Automatic Repeat Request transmission number for a second packet. Memory retains further instructions related to adjusting a reordering release timer value as a function of the Hybrid Automatic Repeat Request transmission number and releasing second packet to upper layers based on the reordering release timer value. Processor is coupled to memory and is configured to execute instructions retained in memory.

Still another aspect relates to a wireless communications apparatus that includes means for ascertaining a first packet has not been successfully received and means for adjusting a reordering release timer value as a function of a transmission attempt number a second packet (or subsequent packets) decoded. Wireless communications apparatus also includes means for calculating a new timer value based on at least the transmission attempt number and means for selectively conveying second packet (or subsequent packets) to the upper layer based on the new timer value.

In accordance with some aspects, means for ascertaining can include means for determining the second packet was received out of order based on an ordering sequence. Additionally or alternatively, means for calculating can include means for evaluating a parameter signaled by a network to calculate the new timer value, wherein the parameter is signaled through a Radio Resource Configuration message. According to some aspects, means for selectively conveying can include means for waiting for expiration of the new timer value to convey the second packet (or subsequent packets) if the new timer value is greater than zero or means for sending the second packet (or subsequent packets) immediately or substantially immediately if the new timer value is less than or equal to zero.

Yet another aspect relates to a computer program product comprising a computer-readable medium. Included in computer-readable medium is a first set of codes for causing a computer to determine that a first packet was not received. First set of codes can include causing the computer to receive and decode a second packet. Computer-readable medium also includes a second set of codes for causing computer to ascertain a transmission attempt number for subsequent packets (e.g., second and future (e.g., third, fourth, and so on) packets). Also included is a third set of codes for causing computer to calculate a reordering release timer value as a function of a minimum Inter Transmission Time Interval, a parameter signaled through a Radio Resource Configuration message, and the transmission attempt number. Further, computer-readable medium includes a fourth set of codes for causing computer to release second packet to upper layers based on reordering release timer value.

Another aspect relates to at least one processor that includes a first module that ascertains a first packet has not been successfully received and a second module that adjusts a reordering release timer value as a function of a transmission attempt number of a second or future packet decoded. The at least one processor also includes a third module that calculates a new timer value based on at least the transmission attempt number and a fourth module that conveys the second and future packets based on the new timer value.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

Disclosed herein are aspects related to dynamically adjusting a reordering release timer in an attempt to mitigate unnecessary latency in a high-speed medium access control (MAC-hs) queue. This latency can critically affect delay sensitive real time applications. In some cases, such as Voice over Internet Protocol (VoIP) or Circuit Switched (CS) voice over High-Speed Packet Access (HSPA), a de-jitter buffer might be operational. A de-jitter buffer can be utilized to offset jitter that might be introduced by queuing in packet switched networks. This offset is provided so that a more continuous stream of information transmitted over the network can be experienced. If a de-jitter buffer is operational, the additional delay introduced by the MAC-hs queue through a reordering release timer can not only affect the delay of packets that were delayed but can affect the delay of all packets since the de-jitter buffer parameters are normally configured for the maximum delayed packets. Using a dynamic "smart" reordering release timer can reduce an overall operational delay of the de-jitter buffer for real time applications.

Further, the disclosed aspects can provide benefits for non real time applications. A large value of a reordering release timer can limit the ability to operate a system with lower Radio Link Control (RLC) Timer Status Prohibit (TSP), which affects throughput and capacity. Timer Status Prohibit controls the flow of status reports from a receiver (e.g., mobile device) to a transmitter (e.g., base station). If Timer Status Prohibit is active, receiver cannot transmit status reports until the timer has expired. Mitigating the length of time associated with the reordering release timer, according to the disclosed aspects, enables systems to operate at lower RLC TSP settings, as well as providing other benefits.

Figure 1:
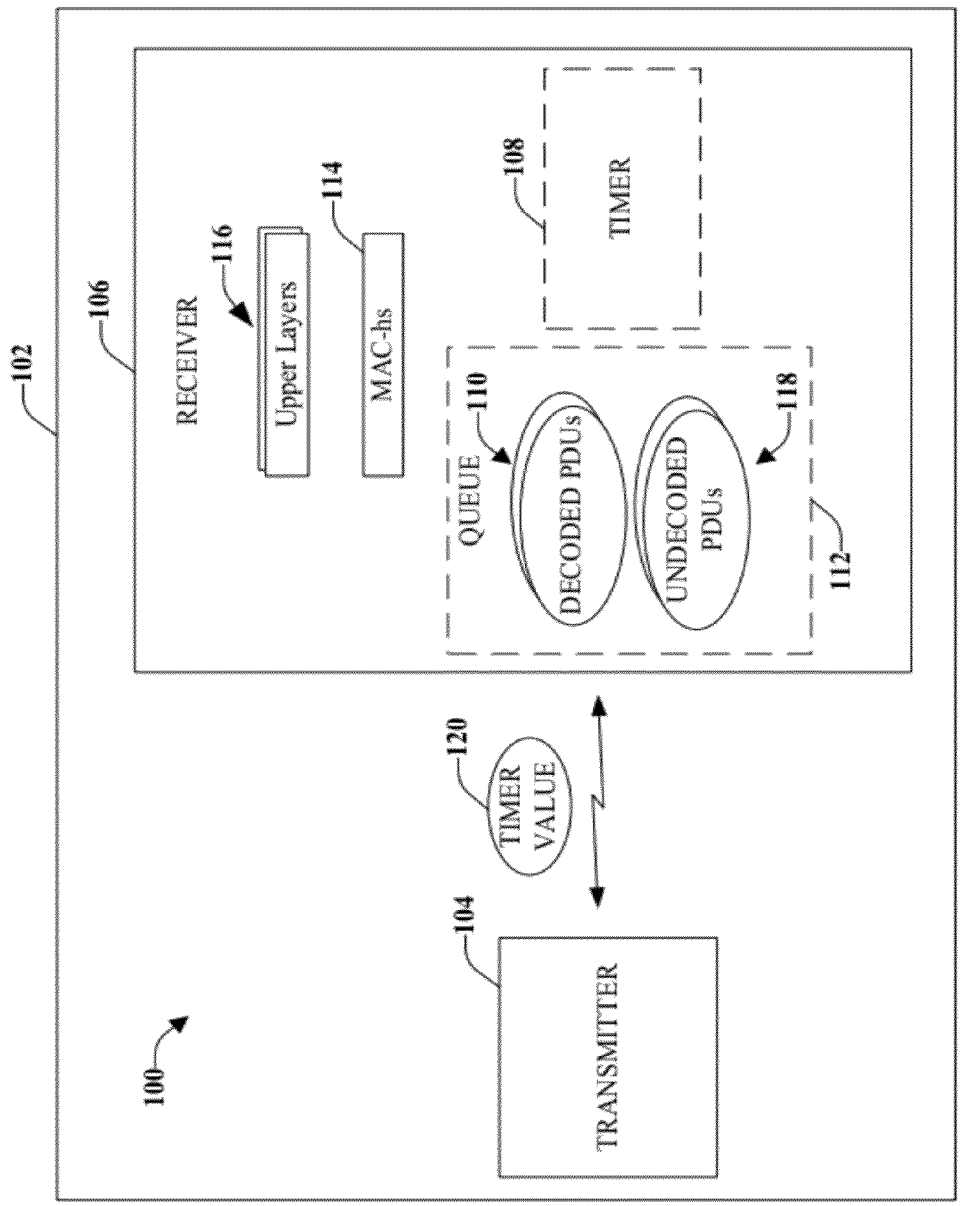
FIG. 1 illustrates a system that utilizes a high-speed medium access control reordering release timer.

With reference to FIG. 1, illustrated is a system 100 that utilizes a MAC-hs reordering release timer. System 100 can be utilized in a wireless communication network 102 that includes a transmitter 104 and a receiver 106. Although a number of transmitter(s) 104 and receiver(s) 106 can be included in system 100, as will be appreciated, a single transmitter 104 that transmits communication data signals to a single receiver 106 is illustrated for purposes of simplicity.

Receiver 106 includes a timer 108 (e.g., MAC-hs reordering release timer T1). In 3GPP High Speed Downlink Packet Access (HSDPA), for example, timer 108 is utilized to release decoded Protocol Data Units (PDUs) 110 (e.g., MAC-hs PDUs) retained in a queue 112 (e.g., MAC-hs queue) from MAC-hs 114 to upper layers 116 (e.g., Radio Link Control (RLC)) after expiration of timer 108. These decoded PDUs 110 are released even though there might be outstanding undecoded PDUs 118 in queue 112 that are not released to upper layers 116.

Timer 108 starts at about the same time as a sequence number hole is detected in queue 112 (e.g., after successfully decoding a first subsequent packet after a missing packet). A primary use of timer 108 is to stall avoidance in queue 112. A timer value 120, in units of seconds or milliseconds, is signaled from transmitter 104 to receiver 106. Transmitter 104 signals timer value 120 per MAC-hs reordering queue 112 utilizing a Radio Resource Configuration (RRC) message (e.g., Radio Bearer Setup, and so on). The signaled timer value 120 is static per MAC-hs reordering queue 112. Under some scenarios, the amount of time the MAC-hs waits before passing the packet (e.g., decoded PDU 110) to upper layers 116 (e.g., RLC layer) affects the latency requirements. This is a factor in all applications, however, this latency can have a substantial impact for a real time delay sensitive application, such as Voice over Internet Protocol (VoIP). The disclosed aspects allow for a dynamic timer, instead of the static timer described with reference to FIG. 1. A dynamic timer can reduce overall latency experienced by applications.

Figure 2:
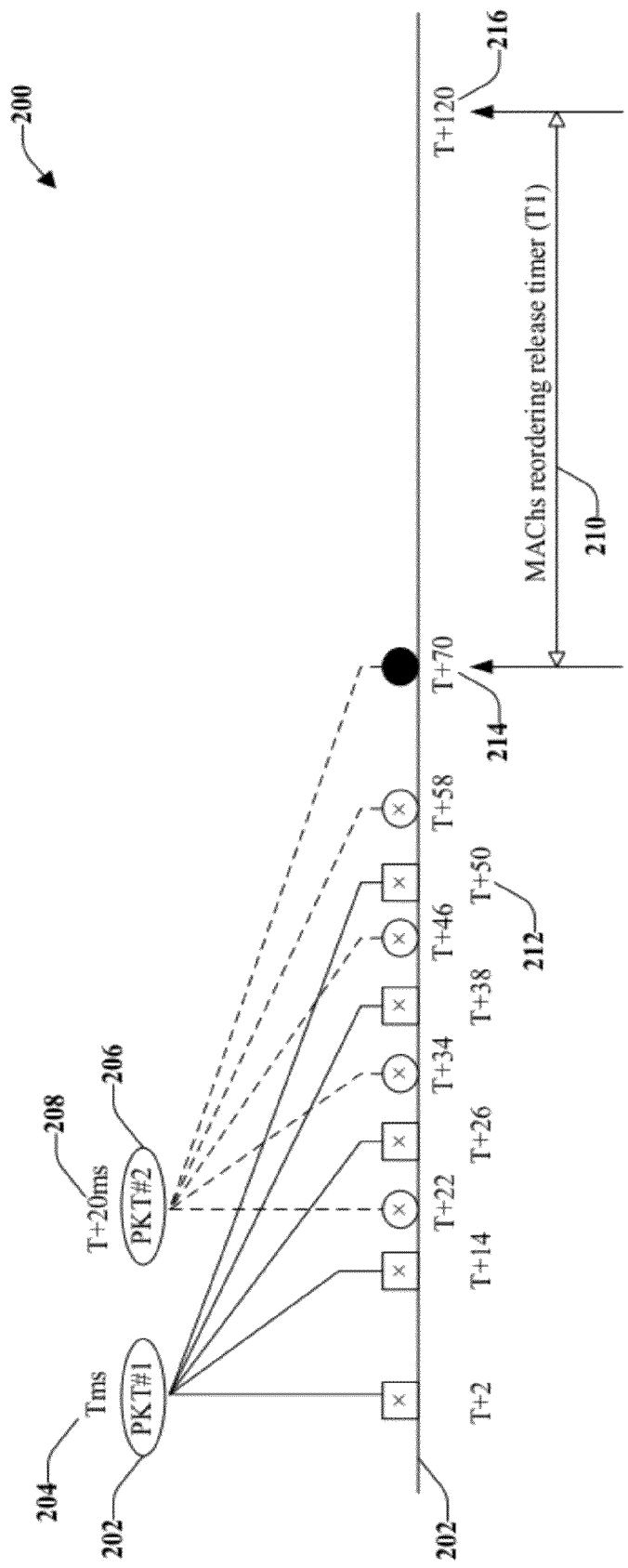
FIG. 2 illustrates a time line representing operation of a high-speed medium access control reordering release timer without utilization of the disclosed aspects.

FIG. 2 illustrates a time line 200 representing operation of a MAC-hs reordering release timer without utilization of the disclosed aspects. As discussed with reference to the above figure, a timer value 120 is signaled to receiver 106 from transmitter 104. Transmitter 104 sends packets to receiver 106 only in a certain order (or sequence) for a first transmission identified by sequence numbers. If a packet is dropped (e.g., is not successfully decoded by receiver 106), the next packets with higher sequence numbers might be received. Receiver 106 identifies that a packet was dropped when the one or more subsequent packets are successfully decoded (out of sequence). When receiver 106 identifies there is a dropped packet, receiver 106 starts timer 108. The length of timer 108 is such that it allows time for the dropped packet to be received through Hybrid Automatic Repeat Request (HARQ) retransmissions. If timer 108 expires, and the dropped packet has not been decoded, the subsequent packets that were successfully decoded are passed to upper layers 116. Thus decoded PDUs 110 (e.g., decoded packets) are only passed to upper layers 116 (e.g., RLC) if either (1) timer 108 expires or (2) the missing sequence number (packet) is decoded through Hybrid Automatic Repeat Request (HARQ).

Timer 108 is oblivious to how many HARQs the current packet (e.g., the decoded packet that led to detection of a hole (e.g., missing packet(s) in the sequence)) has gone through. In this circumstance, timer 108 (which is static) unnecessarily increases the delay experienced by decoded packets and affects application performance. This scenario is further explained with reference to FIG. 2, which describes a scenario for VoIP where voice frames are generated every 20 ms (however, it should be understood that the disclosed aspects can be utilized with other time sensitive or non-time sensitive applications).

Assuming NobeB (e.g., transmitter 104 of FIG. 1) can retransmit immediately or substantially immediately and a mobile device (e.g., receiver 106 of FIG. 1) category allows interTTI (Transmission Time Interval) of one, retransmissions are spaced twelve ms apart (e.g., "T+14", "T+26", "T+38", and "T+50"). As illustrated in time line 200, first packet 202 (PKT#1) is transmitted at time T in milliseconds (Tms 204) and second packet 206 (PKT#2) is transmitted at time T+20 ms 208.

A maximum number of HARQ transmissions has been configured to five and the T1 timer 210 has been configured to 50 ms. As illustrated by time "T+50" 212, all HARQs for first packet 202 have been exhausted (as illustrated at "T+14", "T+26", "T+38", and "T+50"). Thus, first packet 202 was a decode failure. Second packet 206, does not decode for a number of HARQ transmissions (decoding failures illustrated at "T+22", "T+34", "T+46", and "T+58"). However, second packet 206 successfully decodes at the last transmission (at "T+70" 214), which is the last HARQ transmission for second packet 206.

The T1 timer 210 for first packet 202, in this case, is only started at "T+70" 214 (when second packet 206 decoded and it was realized that there is a missing packet) and T1 timer 210 expires at "T+120" 216. Thus, second packet 206 is unnecessarily delayed by 50 ms (e.g., the duration of T1 timer). However, according to the disclosed aspects, which will be described in detail below, second packet 206 could have been passed to RLC as soon as second packet 206 was decoded (at "T+70" 212). Second packet 206 could have been passed earlier since all HARQs for first packet 202 had been exhausted (at "T+50") and there is no chance that first packet 202 will be received (if received after expiration of timer, first packet 202 will be automatically dropped).

Thus, having a static timer as described with reference to the above figures can cause increased delay since the timer has to expire before the successfully decoded packet can be passed to the upper layers. In this example, there is an unnecessary delay of 50 ms. The disclosed aspects can dynamically adjust (e.g., reduce) the timer value as a function of HARQ transmissions, according to an aspect. In accordance with some aspects, timer is adjusted utilizing information already available to a receiver. In accordance with other aspects, timer is adjusted utilizing information that can be signaled to receiver (from transmitter) and/or estimated by receiver.

Figure 3:
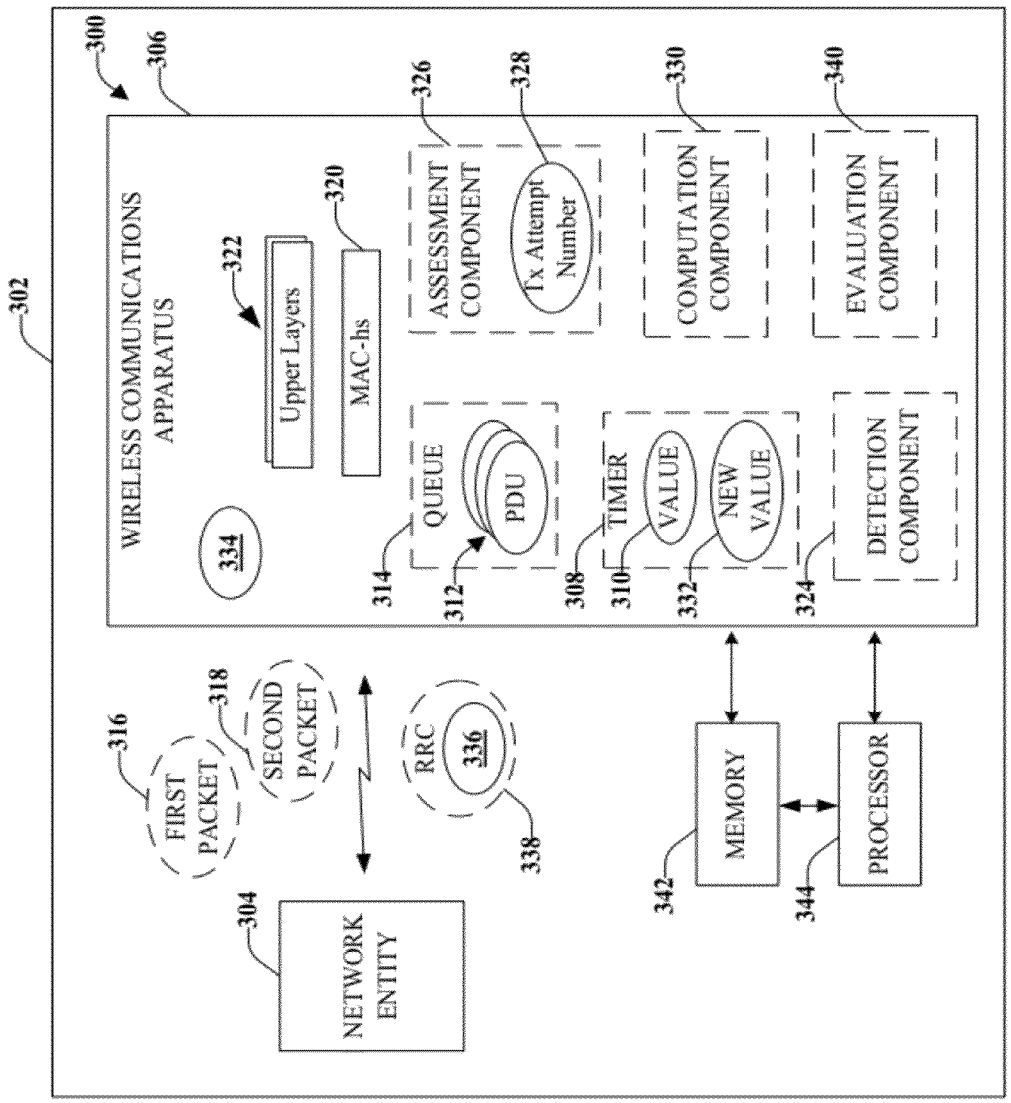
FIG. 3 illustrates a system that utilizes a dynamic high-speed medium access control reordering release timer, according to an aspect.

FIG. 3 illustrates a system 300 that utilizes a dynamic MAC-hs reordering release Timer T1, according to an aspect. System 300 can be utilized in a wireless communication network 302 that includes a network entity 304 (e.g., base station) and a wireless communications apparatus 306 (e.g., mobile device). Although a number of network entity(s) 304 and wireless communications apparatus(s) 306 can be included in wireless communication network 302, as will be appreciated, a single network entity 304 that transmits communication data signals to a single wireless communications apparatus 306 is illustrated for purposes of simplicity.

System 300 can utilize information already available to wireless communications apparatus 306 (such as High Speed Shared Control Channel (HS-SCCH) decode data for current packets and for missing packets) to dynamically adjust a value of timer 308 (timer value 310). This dynamic adjustment of timer value 310 can help reduce latency in wireless communication network 302. In accordance with some aspects, network entity 304 might provide information regarding HARQ attempts, such as by signaling a maximum number of transmissions per MAC-hs queue, which is information wireless communications apparatus 306 can utilize to dynamically adjust timer value 310. According to some aspects, wireless communications apparatus 306 can estimate the maximum number of transmissions based on historical information.

In accordance with some aspects, network entity 304 might signal an amount of time wireless communications apparatus 306 should subtract from timer value 310 (e.g., from static reordering release timer) for every HARQ transmission, which is a parameter that can be utilized by wireless communications apparatus 306 to dynamically adjust timer value 310.

Wireless communications apparatus 306 holds PDUs 312 in a queue 314 if a sequence number hole is detected. The sequence number hole indicates a packet was received out of order (e.g., a first packet 316 (e.g., missing packet), sent before a second packet 318 (e.g., received packet or decoded packet) was sent, has not been successfully received). It should be noted that a plurality of packets can be transmitted from network entity 304 to wireless communications apparatus 306 and a subset of those packets might be successfully received and another subset of those packets might not be successfully received. However, for purposes of explanation, the disclosed aspects are described with reference to a first packet 316 and a second packet 318.

MAC-hs 320 cannot transmit packets to the upper layers 322 out of order (e.g., MAC-hs cannot transmit MAC-hs Transmit Sequence Number (TSN) of 2 before TSN of 1). The transmit time between contiguous TSN's can be as little as one TTI even though packet arrival rate may be lower (e.g., 20 ms for VoIP). Therefore, designing for inter arrival rate of one TTI (2 ms) handles the worst-case scenario.

Wireless communications apparatus 306 includes a detection component 324 that is configured to determine there is a hole in MAC-hs queue 314 based on decoding of a packet sent later in the sequence before decoding of a packet sent earlier in the sequence. For example, detection component 324 determines a first packet 316 was not received based on receipt and decoding of a second packet 318 when first packet 316 was not received and decoded.

An assessment component 326 is configured to ascertain a transmission attempt number 328 for second packet 318 (e.g., the successfully decoded packet). Transmission attempt number 328 can be the number of HARQs that were used (for second packet 318) before second packet 318 was successfully decoded.

Also included in wireless communications apparatus 306 is a computation component 330 that is configured to calculate a new timer value 332. The new timer value 332 can be calculated as a function of a minimum Inter Transmission Time Interval (InterTTI 334), a parameter 336 signaled through an RRC message 338 (from network entity 304), and transmission attempt number 328. InterTTI 334 is the minimum spacing between scheduling instance and can be based on a category of wireless communications apparatus 306. Thus, if wireless communications apparatus 306 is of high performance, it might be able to reschedule every TTI (e.g., every 2 ms). However, if wireless communications apparatus 306 is of lower performance, it might only be able to reschedule every 4 ms (or longer).

In accordance with some aspects, parameter 336 is a T1 timer value (T1_signalled). According to some aspects, parameter 336 is a maximum number of transmissions parameter value (max_trans_signalled). In accordance with some aspects, max_trans_signalled is not conveyed to wireless communications apparatus 306 by network entity 304. In this case, wireless communications apparatus 306 estimates max_trans_signalled based on historical data. For example, wireless communications apparatus 306 can use historical HARQ transmission information to find the maximum number of HARQ attempts that should be utilized to adjust timer value. This maximum HARQ transmission information estimated then can be utilized to adjust timer value.

Timer value 310 is adjusted differently depending on the type of parameter 336 signaled in RRC message 338. There are at least two equations that can be utilized by computation component 330 as a function of parameter 336, which will now be explained.

If parameter 336 is a timer value 310 (which might already be known to wireless communications apparatus 306), computation component 330 calculates new timer value 332 by taking the timer value 310 (T1 signalled) and subtracting the transmit attempt number 328 (Num_Tx) less one (Num_Tx_1). This value is multiplied by ten plus the minimum InterTTI (InterTTI) multiplied by two (10+InterTTI*2). See Equation 1 below.

If parameter 336 is a maximum number of transmissions parameter value, computation component 330 calculates new timer value 310 by talking the maximum number of transmissions parameter value (max_trans_signalled) minus the transmission attempt number 328 (Num_Tx). This value is multiplied by ten plus the minimum InterTTI (InterTTI) multiplied by two (10+InterTTI*2) and then two is subtracted. See Equation 2 below.

As a function of the modified or new timer value 332, evaluation component 340 selectively passes second packet 318 (or its PDU 312) to the upper layers 322. For example, if the new timer value 332 is greater than zero, evaluation component 340 waits until expiration of that new timer value 332 before releasing second packet 318 to the upper layers 322 to allow time for additional HARQ transmission and potential receipt of the missing packet(s). However, if the new timer value 332 is less than or equal to zero, evaluation component 340 zeros all negatives and immediately, or substantially immediately, releases second packet 318 to the upper layers 322. In such a manner, second packet 318 can be released to the upper layers 322 quicker than second packet 318 might have been released utilizing a static timer (as discussed with reference to FIG. 1 and FIG. 2).

In accordance with some aspects, a new timer value 332 might only be calculated for a subset of radio bearers, wherein network has selectability when deciding how a timer should be adjusted for each application. For example, network entity 304 may signal only for CS over HSPA radio bearers. Alternatively, in accordance with some aspects, different timer values can be assigned to different subsets of radio bearers.

System 300 can include memory 342 operatively coupled to wireless communications apparatus 306. Memory 342 can be external to wireless communications apparatus 306 or can reside within wireless communications apparatus 306. Memory 342 retains instructions related to deciding first packet 316 has been lost in a network and determining a Hybrid Automatic Repeat Request transmission number for second packet 318. The instructions related to deciding first packet 316 has been lost in the network can include further instructions related to receiving and decoding second packet 318 out of sequence (e.g., second packet 318 was received before first packet 316 although first packet 316 was earlier in the sequence). In accordance with some aspects, the instructions related to determining the Hybrid Automatic Repeat Request transmission number for second packet 318 can include further instructions related to decoding a High Speed Shared Control Channel of second packet 318.

Memory 342 retains further instructions related to adjusting a reordering release timer value as a function of the Hybrid Automatic Repeat Request transmission number. According to some aspects, instructions related to adjusting the reordering release timer value as the function of a Hybrid Automatic Repeat Request transmission number further adjusts the reordering release timer value based on a minimum Inter Transmission Time Interval and a parameter signaled through a Radio Resource Configuration message. In accordance with some aspects, instructions related to adjusting the reordering release timer value as the function of the Hybrid Automatic Repeat Request transmission number adjusts the reordering release timer value for identified radio bearers.

Further, memory 342 retains instructions related to releasing the second and future packets to upper layers based on the reordering release timer value. In accordance with some aspects, instructions related to releasing the second and future packets to upper layers based on the reordering release timer value further releases the second and future packets immediately (or substantially immediately) if the reordering release timer value is less than or equal to zero. According to some aspects, instructions related to releasing the second and future packets to upper layers based on the reordering release timer value further releases the second packet after expiration of the timer, if the reordering release timer value is greater than zero.

Memory 342 can store protocols associated with dynamically adjusting a reordering release timer, taking action to control communication between network entity 304 and wireless communications apparatus 306, such that system 300 can employ stored protocols and/or algorithms to achieve improved communications in wireless communication network 302 as described herein. It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

At least one processor 344 can be operatively connected to wireless communications apparatus 306 (and/or memory 342) to facilitate analysis of information related to data sample rearrangement in a communication network. Processor 344 can be a processor dedicated to analyzing and/or generating information received by wireless communications apparatus 306, a processor that controls one or more components of system 300, and/or a processor that both analyzes and generates information received by wireless communications apparatus 306 and controls one or more components of system 300.

In accordance with some aspects, processor 344 is configured to dynamically adjust a reordering release timer. Processor 344 can include a first module that ascertains a first packet has not been successfully received and a second module that adjusts a reordering release timer value as a function of a transmission attempt number a second packet decoded. Processor 344 can also include a third module that calculates a new timer value based on at least the transmission attempt number and a fourth module that conveys the second packet based on the new timer value. In accordance with some aspects, first module further determines the second packet was received out of order based on an ordering sequence.

In view of exemplary systems shown and described above, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 4:
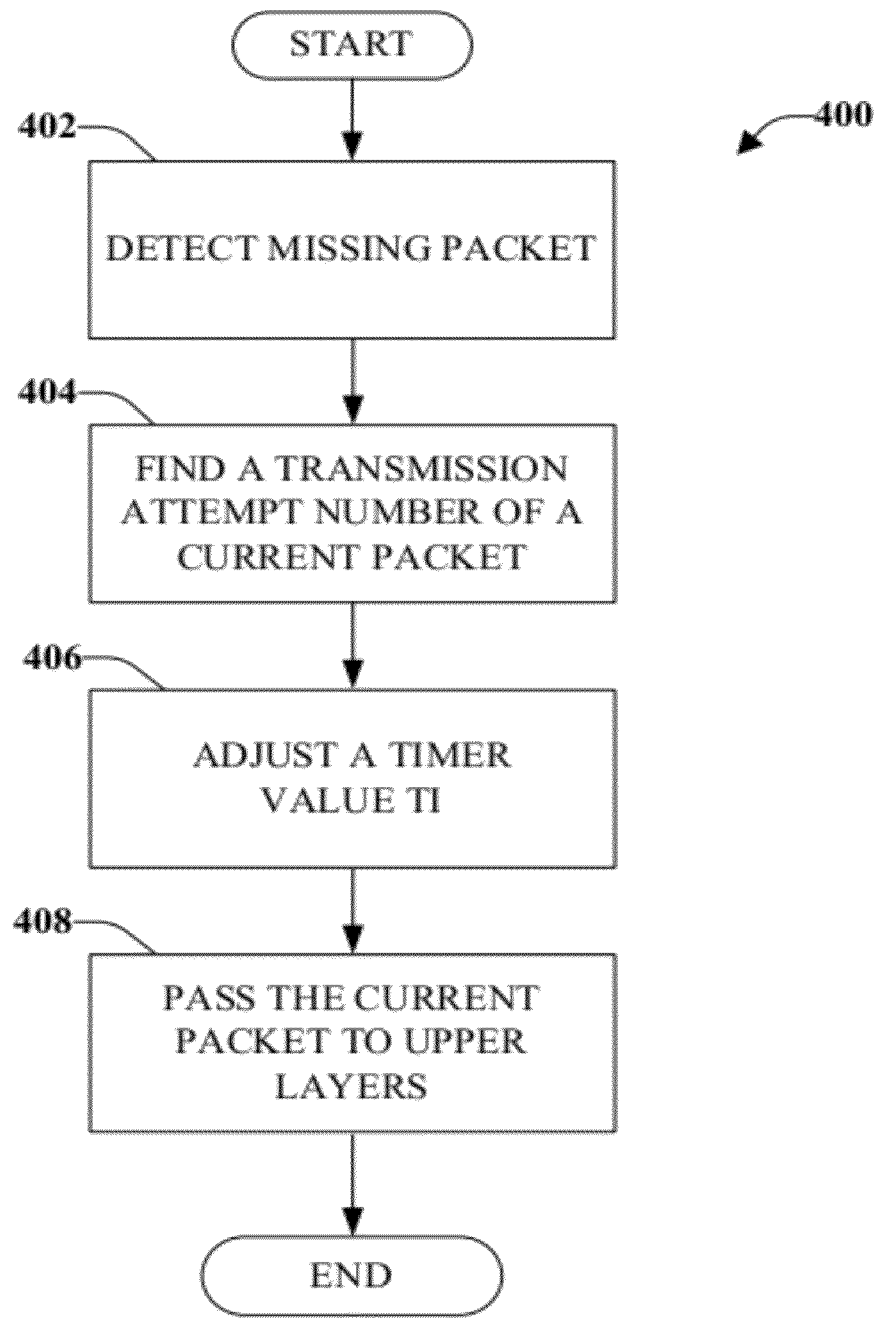
FIG. 4 illustrates a method for calculating a new value for a reordering release timer as a function of a number of hybrid automatic repeat request attempts, according to an aspect.

FIG. 4 illustrates a method 400 for calculating a new value for a reordering release timer as a function of a number of HARQ attempts, according to an aspect. Method 400 starts, at 402, by detecting a first packet was not received (e.g., missing packet). This detection can be a function of receiving and decoding a second packet. Method 400 continues, at 404, by ascertaining a transmission attempt number for the second packet. Transmission attempt number can be the current HARQ retransmission number for the second packet, wherein the ascertaining includes utilizing decoded information from a High Speed Shared Control Channel of the second packet.

A timer value is calculated, at 406, as a function of a minimum Inter Transmission Time Interval, a parameter (which can be signaled through a RRC message), and the transmission attempt number. In accordance with some aspects, the minimum Inter Transmission Time Interval is determined as a function of at least one device capability. The parameter can be read before calculating the timer value, where the parameter is signaled from a base station. In accordance with some aspects, the parameter is a static timer value. According to some aspects, the parameter is a maximum number of transmissions parameter value. In some aspects, the parameter is a value for each transmission attempt and the value is subtracted from the timer value for each transmission attempt.

At 408, the second packet is released to the upper layers as a function of the timer value. Second packet can be released immediately (or substantially immediately) if the new timer value is less than or equal to zero. If the new timer value is greater than zero, second packet is passed to the upper layers after expiration of the new timer value. In accordance with some aspects, the timer value might only be adjusted for a subset of identified radio bearers.

Figure 5:
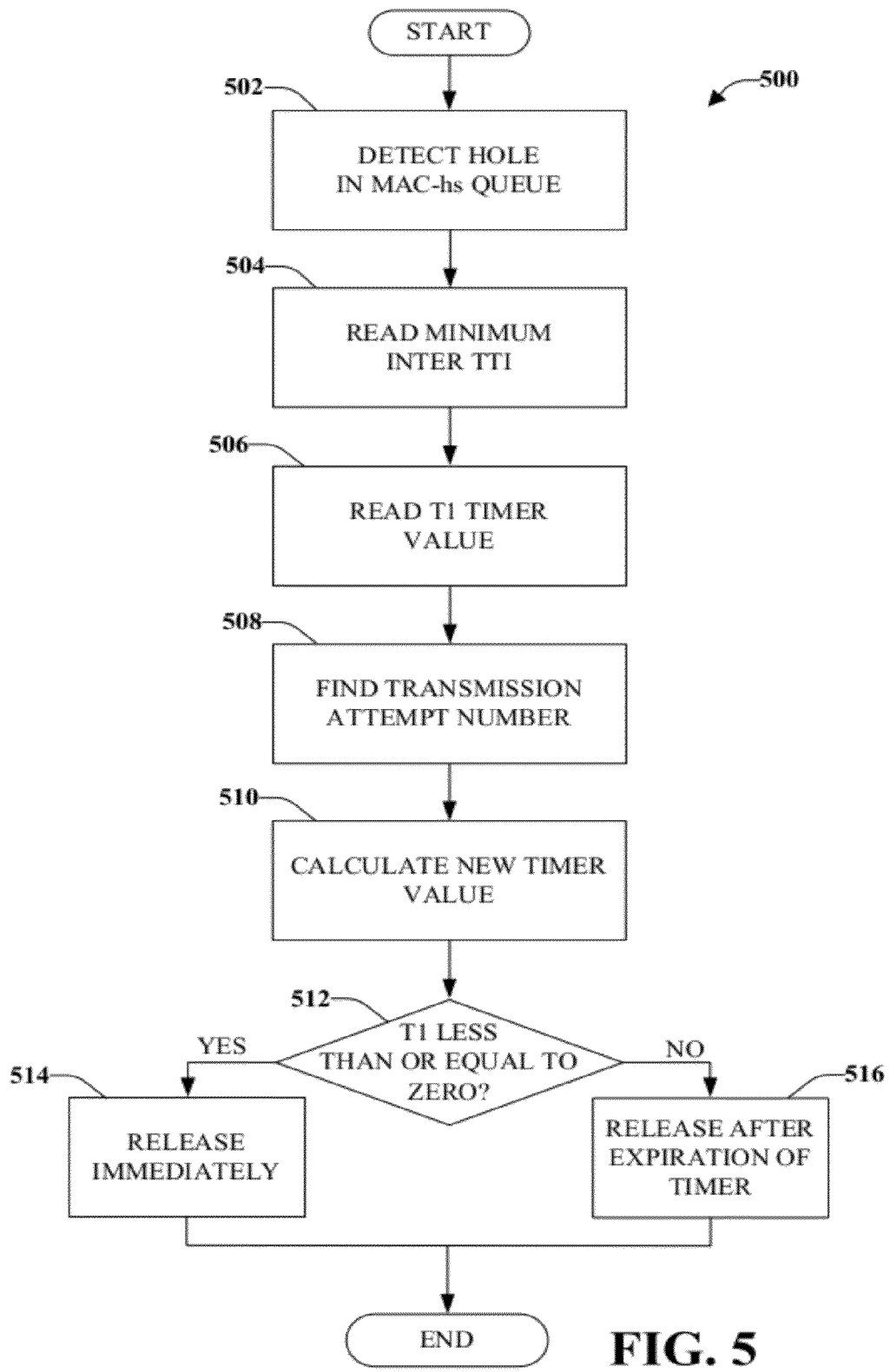
FIG. 5 illustrates a method for dynamically adjusting a reordering release timer T1, according to an aspect.

FIG. 5 illustrates a method 500 for dynamically adjusting a reordering release timer T1, according to an aspect. Through dynamic adjustment of the reordering release timer T1, unnecessary latency in a MAC-hs queue can be reduced. The latency can critically affect delay sensitive real time applications, such as VoIP. If a de jitter buffer is operational the additional delay introduced by the MAC-hs queue through the T1 timer can affect the delay of all packets since the de jitter buffer parameters might be configured for the maximum delayed packets. Thus, dynamically adjusting the reordering release timer can reduce an overall operations delay of the de jitter buffer (if used). Further, for non-real time applications, a large value of T1 timer can limit the ability to operate with lower RLC Timer Status Prohibit (TSP), which can affect throughput and capacity. Thus dynamically adjusting the reordering release timer T1 can enable operations at lower RLC TSP settings.

Method 500 starts, at 502, when a hole in a MAC-hs queue is detected. This detection can occur when a packet is received out of sequence. For example, a first packet, identified as Sequence Number One, is transmitted and a second packet, identified as Sequence Number Two, is transmitted. During transmission, Sequence Number One (e.g., first packet) was lost between transmitter and receiver. However, Sequence Number Two (e.g., second packet) was received at, and decoded by, receiver. The receipt of Sequence Number Two (e.g., second packet) is out of sequence because Sequence Number One (e.g., first packet) was not received.

MAC-hs cannot transmit packets out of order (e.g., MAC-hs Transmit Sequence Number (TSN) of 2 before TSN of 1). The transmit time between contiguous TSN's can be as little as one TTI, even though the packet arrival rate may be lower (for example, 20 ms for VoIP). Therefore, designing for inter-arrival rate of one TTI (2 ms) handles the worst-case scenario.

At 504, a Minimum Inter TTI interval (min InterTTI) is read. The InterTTI can be a function of at least the category of the mobile device. For example, some mobile devices (e.g., a high performance device) can reschedule every TTI (e.g., every 2 ms). However, other mobile devices cannot reschedule as quickly and might take longer to reschedule (e.g., every 4 ms, every 6 ms, and so on). This information can be known to both network and mobile device.

The T1 timer value is read, at 506. The T1 timer value can be signaled through a relevant RRC message (e.g., T1_signalled). At 508, the transmission attempt number the current packet decoded (Num_Tx) is found. This can be found using HS-SCCH decode information of the current packet (e.g., HARQ process ID, NDI bit). For example, the number of HS-PDSCH decode failures for a particular HARQ process ID can be used to find Num_Tx.

A new timer value T1 is calculated, at 510. This value can be calculated by taking the T1 timer value read, at 506 and subtracting the value of the transmission attempt number, found at 508, less one. This is multiplied by the value 10 plus the InterTTI multiplied by two. In accordance with some aspects, instead of using the sum of $^{(10+InterTTI \times 2)}$, a different value can be utilized, such as 12 ms, for example The equation for this is as follows:

$$T1 = T1\_signalled - (Num\_Tx - 1) \times (10 + InterTTI \times 2) \quad \text{Equation 1.}$$

Method 500 continues, at 512, with a determination whether the result calculated, at 510, is less than or equal to zero. If the result is equal to zero or less than zero ("YES"), at 514, the packet is passed immediately to the upper layers. If the result is more than zero ("NO"), at 516, the packet is passed after expiration of the new timer value calculated, at 510, to allow time for further HARQ transmissions of the missing packet(s).

Figure 6:
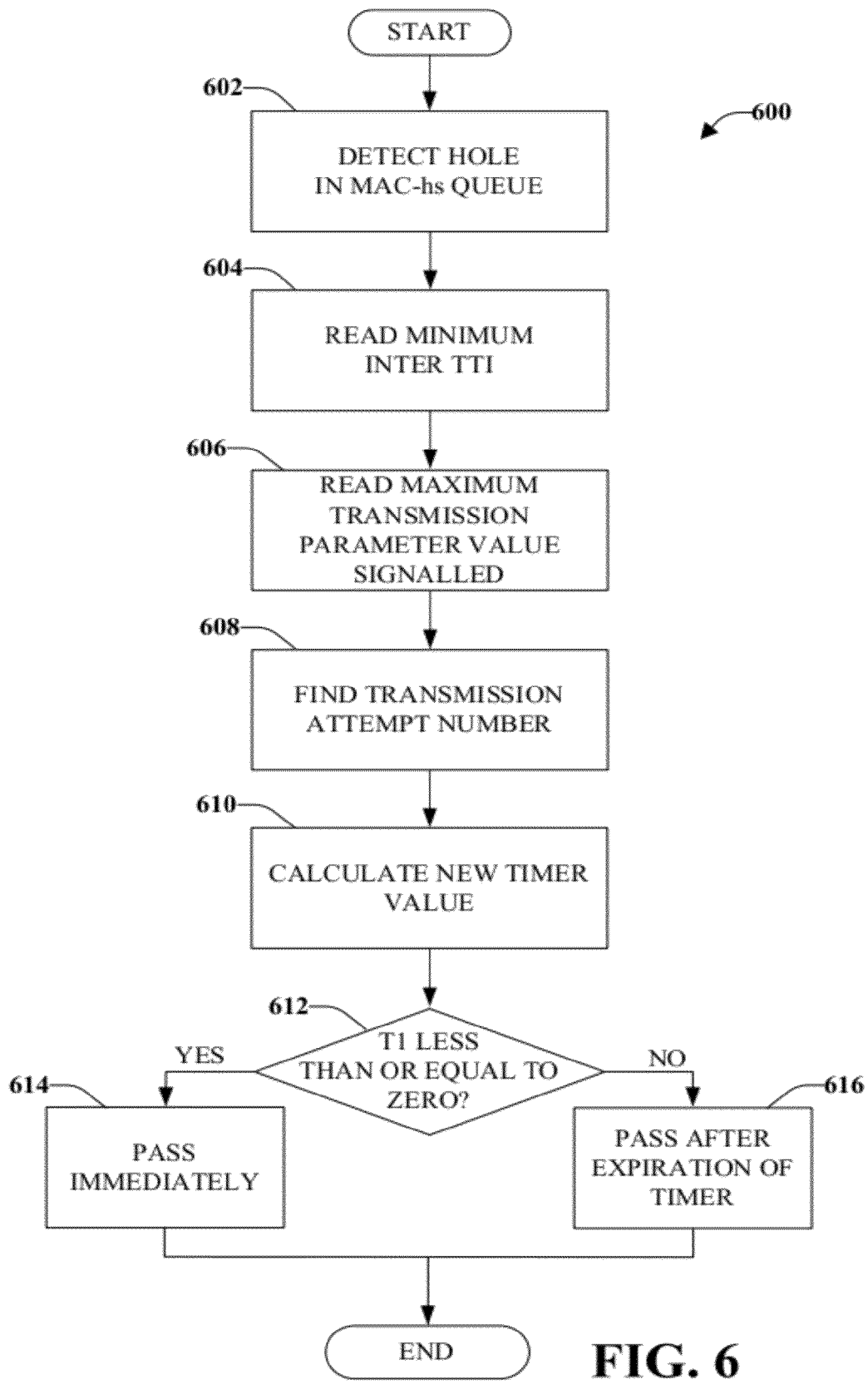
FIG. 6 illustrates a method for dynamically adjusting a reordering release timer as a function of parameter values signaled though a radio resource configuration message, according to an aspect.

FIG. 6 illustrates a method 600 for dynamically adjusting a reordering release timer T1 as a function of parameter values signaled though an RRC message, according to an aspect. A network could signal a maximum number of transmission parameter through an RRC message per MAC-hs queue indicating the maximum HARQ attempts for a MAC-hs PDU. In accordance with some aspects, this can be designed for an inter arrival rate of one TTI (2 ms) for handling the worst-case situation.

Method 600 starts, at 602, when a hole in MAC-hs queue is detected. This can be detected based on receiving packets out of order (e.g., a second packet in a sequence is received but a first packet (or earlier packet in the sequence) is not received). At 604, a minimum InterTTI interval (min InterTTI) is read. The minimum InterTTI interval can be a function of the category of the mobile device.

At 606, a maximum number of transmissions parameter value (max_trans_signalled) signaled through a relevant RRC message is read. The transmission attempt number (Num_Tx) the current packet decoded is read, at 608. This can be found using HS-SCCH decode information of the current packet (e.g., HARQ process ID, NDI bit). For example, the number of HS-PDSCH decode failures for a particular HARQ process ID can be used to find Num_Tx.

A new timer Value T1 is calculated, at 610. Value T1 can be calculated by taking the maximum number of transmissions signaled and read, at 606, and subtracting the transmission attempt number found, at 608. This value is multiplied by the value of ten plus the InterTTI read, at 604, multiplied by 2. The sum is subtracted by two. In accordance with some aspects, instead of using the sum of $^{(10+InterTTI \times 2)}$, a different value can be utilized, such as 12 ms, for example. The equation for this is as follows:

$$T1 = (max\_trans\_signalled - Num\_Tx) \times (10 + InterTTI \times 2) - 2 \quad \text{Equation 2.}$$

In accordance with some aspects, the network can also signal the above parameters to adjust T1 only for certain Radio Bearers (e.g., network may signal only for CS over HSPA radio bearers). Additionally or alternatively, the disclosed methods can apply a dynamic adjustment to the T1 timer only for certain radio bearers.

According to some aspects, the max_trans_signalled value can be estimated by a mobile device based on past HARQ attempts, if the max_trans_signalled value is not explicitly signaled. For example, the mobile device can use a history of previous HARQ transmissions and estimate the maximum number of HARQ attempts. Based on this history, the mobile device can use this estimate to be the max_trans_signalled parameter if such a parameter is not already explicitly signaled by the network. In this aspect, method 600 includes estimating a value for each transmission attempt based on historical transmission attempts and subtracting the estimated value for each transmission attempt from a static reordering release timer.

In accordance with some aspects, a computer program product can include a computer-readable medium that comprises codes for carrying out various aspects of various methods. Computer-readable medium can include a first set of codes for causing a computer to determine that a first packet was not received. The first set of codes can include causing the computer to receive and decode a second packet. Also included is a second set of codes for causing the computer to ascertain a transmission attempt number for second packet. Computer-readable medium also includes a third set of codes for causing the computer to calculate a reordering release timer value as a function of a minimum Inter Transmission Time Interval, a parameter signaled through a Radio Resource Configuration message, and the transmission attempt number. Further, computer-readable medium includes a fourth set of codes for causing the computer to release second packet to upper layers based on the reordering release timer value. In accordance with some aspects, fourth set of codes releases second packet immediately, or substantially immediately, if the reordering release timer value is less than or equal to zero.

Figure 7:
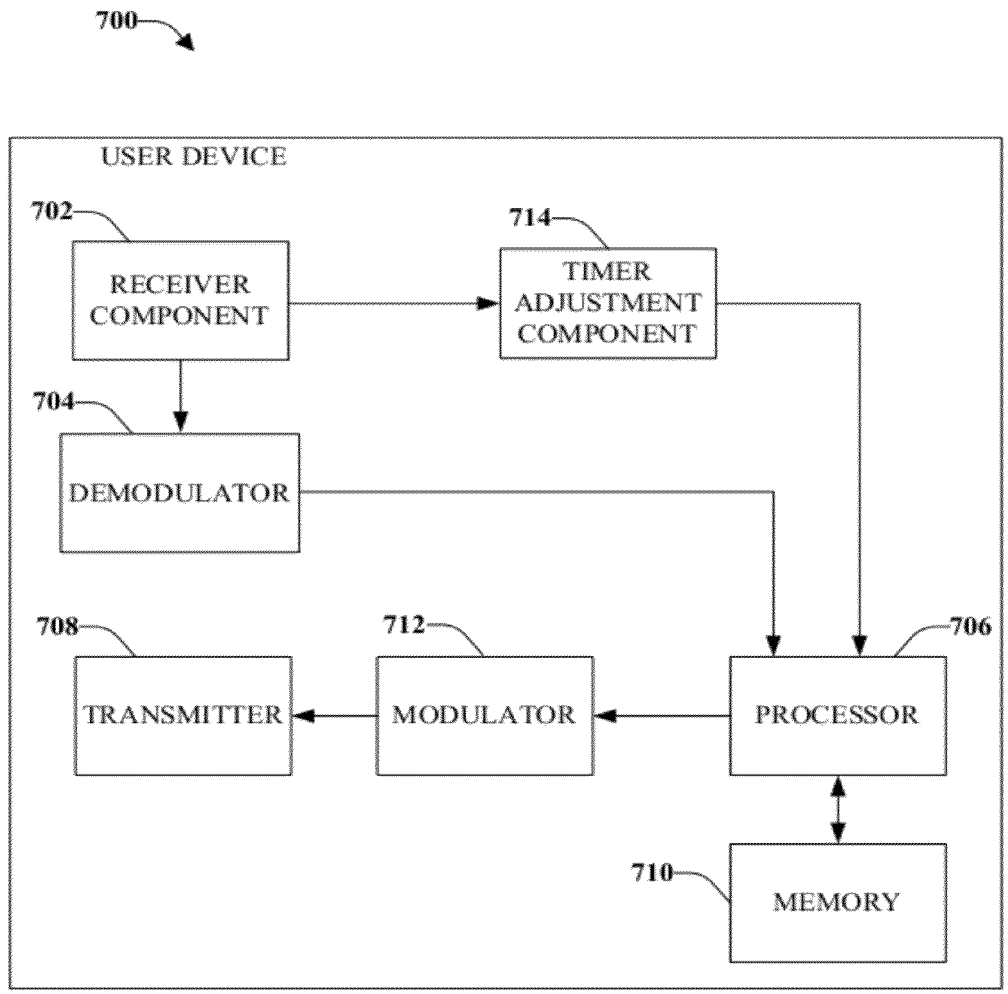
FIG. 7 illustrates a system that facilitates a reordering release timer adjustment in accordance with one or more of the disclosed aspects.

With reference now to FIG. 7, illustrated is a system 700 that facilitates a reordering release timer adjustment in accordance with one or more of the disclosed aspects. System 700 can reside in a user device. System 700 comprises a receiver component 702 that can receive a signal from, for example, a receiver antenna. Receiver component 702 can perform typical actions thereon, such as filtering, amplifying, downconverting, etc. the received signal. Receiver component 702 can also digitize the conditioned signal to obtain samples. A demodulator 704 can obtain received symbols for each symbol period, as well as provide received symbols to a processor 706.

Processor 706 can be a processor dedicated to analyzing information received by receiver component 702 and/or generating information for transmission by a transmitter 708. In addition or alternatively, processor 706 can control one or more components of system 700, analyze information received by receiver component 702, generate information for transmission by transmitter 708, and/or control one or more components of system 700. Processor 706 may include a controller component capable of coordinating communications with additional user devices.

System 700 can additionally comprise memory 710 operatively coupled to processor 706. Memory 710 can store information related to coordinating communications and any other suitable information. Memory 710 can additionally store protocols associated with dynamically adjusting a timer. System 700 can further comprise a symbol modulator 712, wherein transmitter 708 transmits the modulated signal.

Receiver component 702 is further operatively coupled to a timer adjustment component 714 that is configured to dynamically adjust a reordering release timer as a function of a number of HARQ attempts. The reordering release timer can also be adjusted as a function of a signaled timer value and an InterTTI. Further, the reordering release timer can be adjusted as a function of a maximum number of transmissions parameter value and an InterTTI. In accordance with some aspects, reordering release timer is adjusted for a subset of radio bearers. According to some aspects, the parameter signaled is a value that should be subtracted from a timer value for every HARQ attempt.

Figure 8:
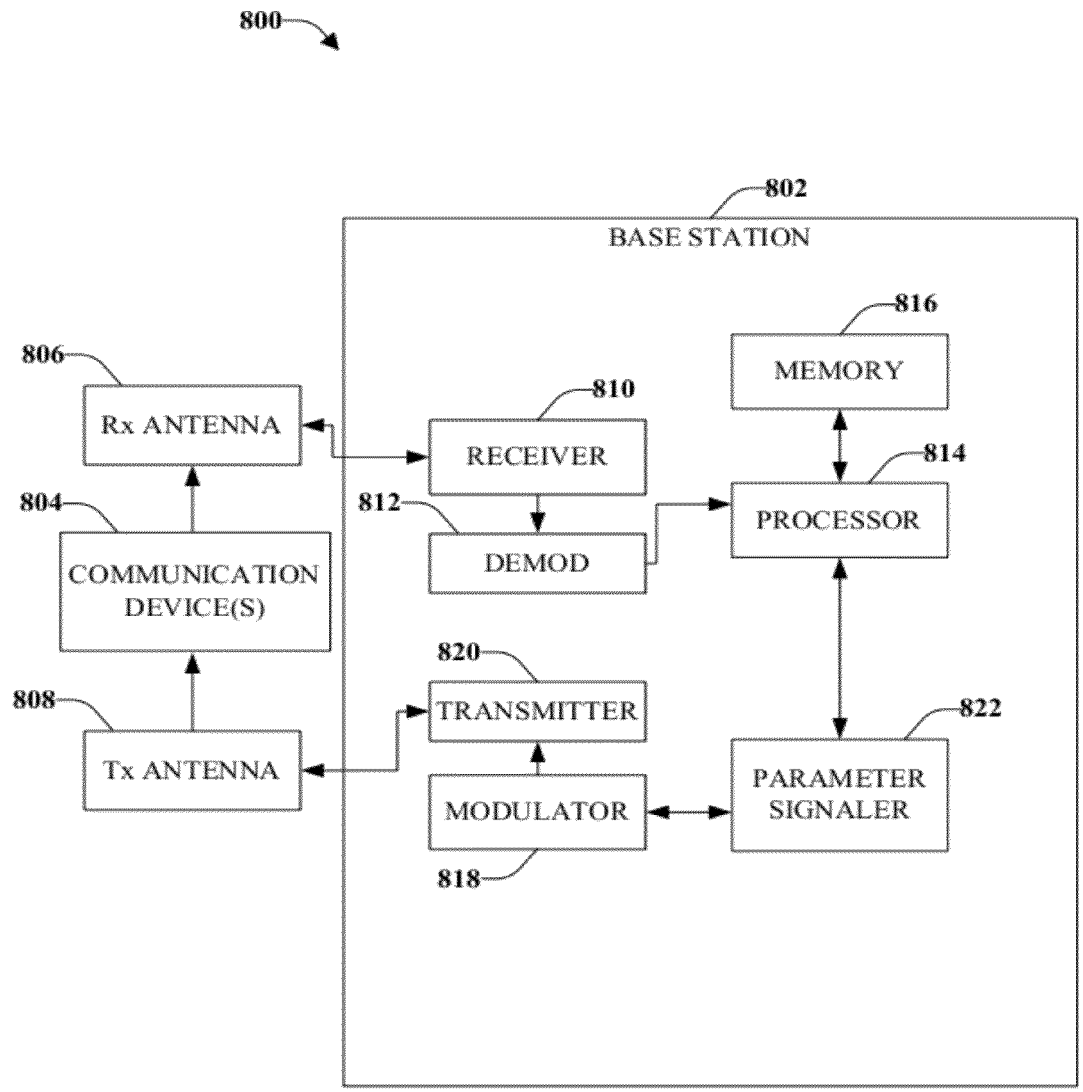
FIG. 8 illustrates a system that conveys information that can be used to adjust a reordering release timer in accordance with various aspects presented herein.

FIG. 8 is an illustration of a system 800 that conveys information that can be used to adjust a reordering release timer in accordance with various aspects presented herein. System 800 comprises a base station or access point 802. As illustrated, base station 802 receives signal(s) from one or more communication devices 804 (e.g., user device) by a receive antenna 806, and transmits to the one or more communication devices 804 through a transmit antenna 808.

Base station 802 comprises a receiver 810 that receives information from receive antenna 806 and is operatively associated with a demodulator 812 that demodulates received information. Demodulated symbols are analyzed by a processor 814 that is coupled to a memory 816 that stores information related to a signaling information to facilitate adjustment to a reordering release timer. A modulator 818 can multiplex the signal for transmission by a transmitter 820 through transmit antenna 808 to communication devices 804.

Processor 814 is further coupled to a parameter signaler 822 that is configured to signal various parameters over the air to allow a mobile device to dynamically adjust a reordering release timer. The parameters signaled can include a T1 timer value and a maximum number of transmissions parameter value. In accordance with some aspects, the parameter signaled relates to at least a subset of radio bearers.

Figure 9:
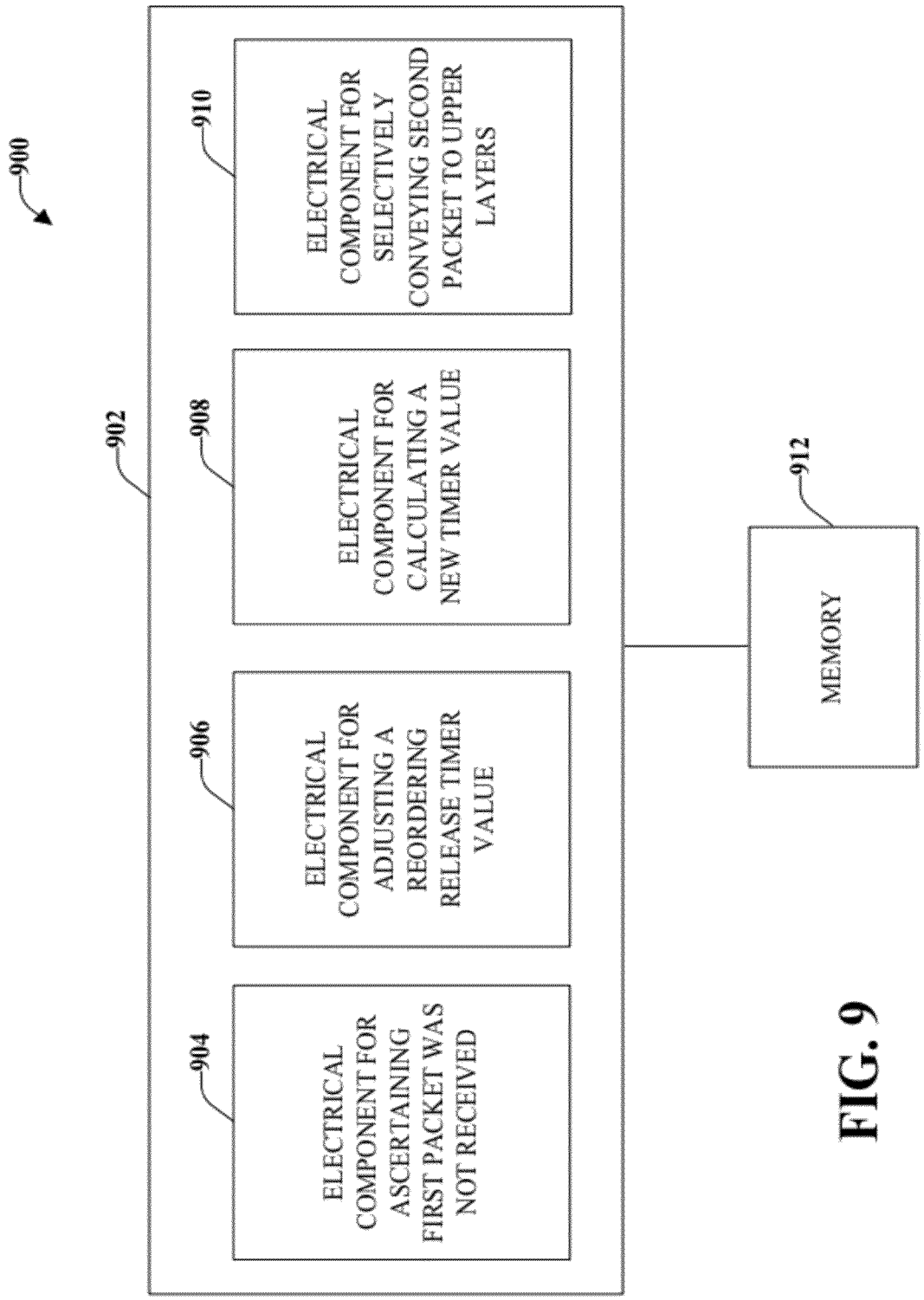
FIG. 9 illustrates an example system that dynamically adjusts a reordering release timer as a function of various parameters, including a number of hybrid automatic repeat request attempts, according to an aspect.

With reference to FIG. 9, illustrated is an example system 900 that dynamically adjusts a reordering release timer as a function of various parameters, including a number of HARQ attempts, according to an aspect. System 900 may reside at least partially within a mobile device. It is to be appreciated that system 900 is represented as including functional blocks, which may be functional blocks that represent functions implemented by a processor, software, or combination thereof (e.g., firmware).

System 900 includes a logical grouping 902 of electrical components that can act separately or in conjunction. Logical grouping 902 includes an electrical component 904 for ascertaining a first packet has not been successfully received. In accordance with some aspects, electrical component 904 includes an electrical component for determining the second packet was received out of order based on an ordering sequence.

Also included in logical grouping 902 is an electrical component 906 for adjusting a reordering release timer value as a function of a transmission attempt number needed to decode a second packet. In accordance with some aspects, electrical component 906 uses a High Speed Shared Control Channel decode information of the second packet to determine the transmission attempt number for the second packet decoded. According to some aspects, electrical component 906 includes an electrical component for determining the transmission attempt number for the decoded second packet based on a High Speed Shared Control Channel decode information of the second packet.

Further, logical grouping 902 includes an electrical component 908 for calculating a new timer value based on at least the transmission attempt number. In accordance with some aspects, electrical component 908 includes an electrical component for evaluating a parameter signaled by a network to calculate the new timer value, wherein the parameter is signaled through a Radio Resource Configuration message.

Logical grouping 902 also includes an electrical component 910 for selectively conveying the second packet based on the new timer value. In accordance with some aspects, electrical component 910 includes an electrical component that waits for expiration of the new timer value to convey second packet if new timer value is greater than zero. According to some aspects, electrical component 910 includes an electrical component for sending second packet immediately (or substantially immediately) if new timer value is less than or equal to zero.

Additionally, system 900 can include a memory 912 that retains instructions for executing functions associated with electrical components 904, 906, 908, and 910 or other components. While shown as being external to memory 912, it is to be understood that one or more of electrical components 904, 906, 908, and 910 may exist within memory 912.

Figure 10:
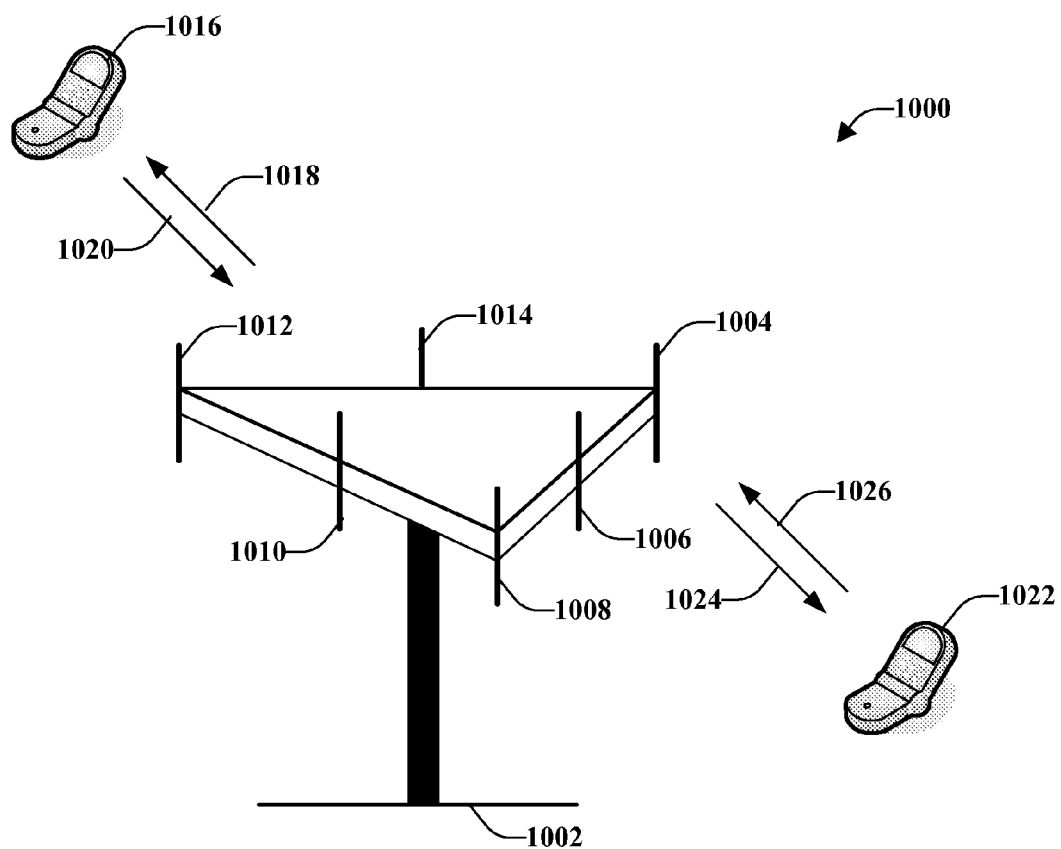
FIG. 10 illustrates a multiple access wireless communication system according to one or more aspects.

Referring now to FIG. 10, a multiple access wireless communication system 1000 according to one or more aspects is illustrated. A wireless communication system 1000 can include one or more base stations in contact with one or more user devices. Each base station provides coverage for a plurality of sectors. A three-sector base station 1002 is illustrated that includes multiple antenna groups, one including antennas 1004 and 1006, another including antennas 1008 and 1010, and a third including antennas 1012 and 1014. According to the figure, only two antennas are shown for each antenna group, however, more or fewer antennas may be utilized for each antenna group. Mobile device 1016 is in communication with antennas 1012 and 1014, where antennas 1012 and 1014 transmit information to mobile device 1016 over forward link 1018 and receive information from mobile device 1016 over reverse link 1020. Forward link (or downlink) refers to communication link from base stations to mobile devices, and reverse link (or uplink) refers to communication link from mobile devices to base stations. Mobile device 1022 is in communication with antennas 1004 and 1006, where antennas 1004 and 1006 transmit information to mobile device 1022 over forward link 1024 and receive information from mobile device 1022 over reverse link 1026. In a FDD system, for example, communication links 1018, 1020, 1024, and 1026 might utilize different frequencies for communication. For example, forward link 1018 might use a different frequency than the frequency utilized by reverse link 1020.

Each group of antennas and/or the area in which they are designated to communicate may be referred to as a sector of base station 1002. In one or more aspects, antenna groups each are designed to communicate to mobile devices in a sector or the areas covered by base station 1002. A base station may be a fixed station used for communicating with mobile devices.

In communication over forward links 1018 and 1024, transmitting antennas of base station 1002 can utilize beamforming in order to improve a signal-to-noise ratio of forward links for different mobile devices 1016 and 1022. Also, a base station utilizing beamforming to transmit to mobile devices scattered randomly through its coverage area might cause less interference to mobile devices in neighboring cells than the interference that can be caused by a base station transmitting through a single antenna to all mobile devices in its coverage area.

Figure 11:
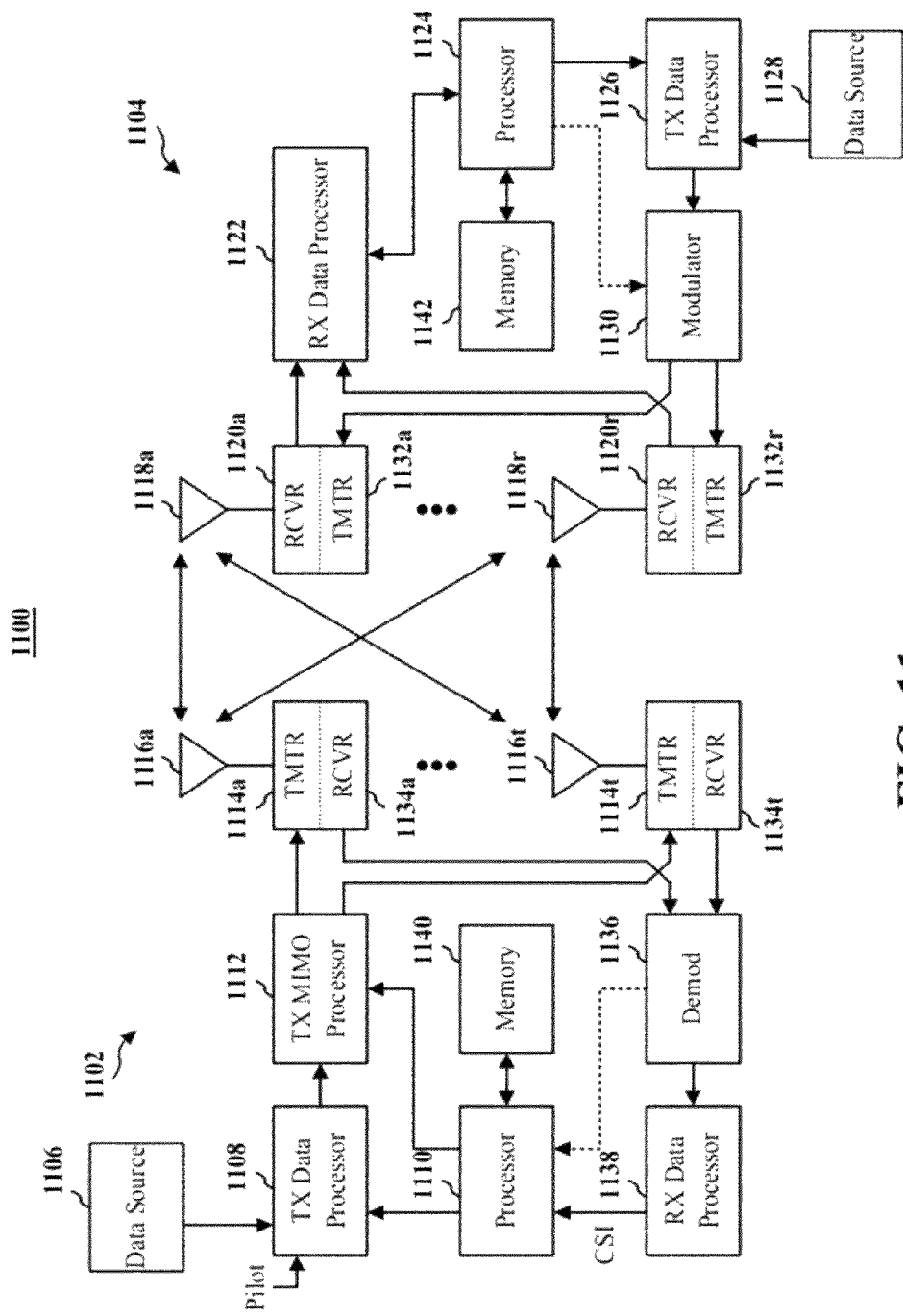
FIG. 11 illustrates an example wireless communication system, according to an aspect.

FIG. 11 illustrates an example wireless communication system 1100, according to an aspect. The wireless communication system 1100 depicts one base station 1102 and one mobile device 1104 for sake of brevity. However, it is to be appreciated that system 1100 can include more than one base station and/or more than one mobile device, wherein additional base stations and/or mobile devices can be substantially similar or different from example base station 1102 and mobile device 1104 described below. In addition, it is to be appreciated that base station 1102 and/or mobile device 1104 can employ the systems and/or methods described herein to facilitate wireless communication there between.

At base station 1102, traffic data for a number of data streams is provided from a data source 1106 to a transmit (TX) data processor 1108. According to an example, each data stream can be transmitted over a respective antenna. TX data processor 1108 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1104 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1110.

The modulation symbols for the data streams can be provided to a TX MIMO processor 1112, which can further process the modulation symbols (e.g., for OFDM). TX MIMO processor 1112 then provides $N_T$ modulation symbol streams to $N_T$ transmitters (TMTR) 1114a through 1114t. In various embodiments, TX MIMO processor 1112 applies beamforming weights to the symbols of the data streams and to the antenna from which the symbol is being transmitted.

Each transmitter 1114 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1114a through 1114t are transmitted from $N_T$ antennas 1116a through 1116t, respectively.

At mobile device 1104, the transmitted modulated signals are received by $N_R$ antennas 1118a through 1118r and the received signal from each antenna 1118 is provided to a respective receiver (RCVR) 1120a through 1120r. Each receiver 1120 conditions (e.g., filters, amplifies, and downconverts) a respective signal, digitizes the conditioned signal to provide samples, and further processes the samples to provide a corresponding "received" symbol stream.

An RX data processor 1122 can receive and process the $N_R$ received symbol streams from $N_R$ receivers 1120 based on a particular receiver processing technique to provide $N_T$ "detected" symbol streams. RX data processor 1122 can demodulate, deinterleave, and decode each detected symbol stream to recover the traffic data for the data stream. The processing by RX data processor 1122 is complementary to that performed by TX MIMO processor 1112 and TX data processor 1108 at base station 1102.

A processor 1124 can periodically determine which precoding matrix to utilize as discussed above. Further, processor 1124 can formulate a reverse link message comprising a matrix index portion and a rank value portion.

The reverse link message can comprise various types of information regarding the communication link and/or the received data stream. The reverse link message can be processed by a TX data processor 1126, which also receives traffic data for a number of data streams from a data source 1128, modulated by a modulator 1130, conditioned by transmitters 1132a through 1132r, and transmitted back to base station 1102.

At base station 1102, the modulated signals from mobile device 1104 are received by antennas 1116, conditioned by receivers 1134a though 1134t, demodulated by a demodulator 1136, and processed by a RX data processor 1138 to extract the reverse link message transmitted by mobile device 1104. Further, processor 1110 can process the extracted message to determine which precoding matrix to use for determining the beamforming weights.

Processors 1110 and 1124 can direct (e.g., control, coordinate, manage, etc.) operation at base station 1102 and mobile device 1104, respectively. Respective processors 1110 and 1124 can be associated with memory 1140 and 1142 that store program codes and data. Processors 1110 and 1124 can also perform computations to derive frequency and impulse response estimates for the uplink and downlink, respectively.

It is to be understood that aspects described herein may be implemented by hardware, software, firmware, middleware, microcode, or any combination thereof. When t implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA), a digital signal processing device (DSPD), programmable logic device (PLD), or other logic device, discrete gate or transistor logic, discrete hardware components, or any combination thereof designed to perform functions described herein. A general-purpose processor may be a microprocessor, but, in the alternative, processor may be any conventional processor, controller, microcontroller, state machine, other electronic units designed to perform the functions described herein, or a combination thereof. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine-readable medium and/or computer readable medium, which may be incorporated into a computer program product.

While the detailed description includes illustrative aspects and/or embodiments, it should be noted that various changes and modifications could be made herein without departing from the scope of described aspects and/or embodiments as defined by the appended claims. Accordingly, described aspects are intended to embrace all such alterations, modifications and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. Components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features are presented in terms of systems that may include a number of devices, components, modules, and the like. It is to be understood and appreciated that various systems may include additional devices, components, modules, and so forth, and/or may not include all devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete manner.

What is claimed is:

1. A method, comprising:
   determining a first packet was not received, wherein the determining comprises receiving and decoding a second packet;
   ascertaining a transmission attempt number for the second packet;
   calculating a timer value as a function of a minimum Inter Transmission Time Interval signaled through a Radio Resource Configuration message, a parameter, and the transmission attempt number; and
   passing the second packet to upper layers based on the timer value, wherein the passing at least comprises passing the second packet to the upper layers after expiration of the timer value if the timer value is greater than zero.

2. The method of claim 1, wherein the ascertaining comprises utilizing decoded information from a High Speed Shared Control Channel of the second packet.

3. The method of claim 1, wherein the passing comprises passing the second packet to the upper layers immediately, or substantially immediately, if the timer value is less than or equal to zero.

4. The method of claim 1, further comprising reading the parameter before calculating the timer value, wherein the parameter is a static timer value.

5. The method of claim 1, further comprising reading the parameter before the calculating, wherein the parameter is a maximum number of transmissions parameter value.

6. The method of claim 1, further comprising:
   reading the parameter before the calculating, wherein the parameter is a value for each transmission attempt; and
   subtracting the value for each transmission attempt from a static reordering release timer.

7. The method of claim 1, further comprising:
   estimating a value for each transmission attempt based on historical transmission attempts; and
   subtracting the estimated value for each transmission attempt from a static reordering release timer.

8. The method of claim 1, further comprising determining the minimum Inter Transmission Time Interval as a function of at least one device capability.

9. The method of claim 1, wherein the calculating includes calculating a timer value T1 for at least a subset of radio bearers.

10. A wireless communications apparatus, comprising:
    a memory that retains instructions related to deciding if a first packet has been lost in a network, determining a Hybrid Automatic Repeat Request transmission number for a second packet, adjusting a reordering release timer value as a function of the Hybrid Automatic Repeat Request transmission number, and releasing the second packet to upper layers based on the reordering release timer value at least comprising releasing the second packet after expiration of the reordering release timer if the reordering release timer value is greater than zero; and
    a processor, coupled to the memory, configured to execute the instructions retained in the memory.

11. The wireless communications apparatus of claim 10, wherein the instructions related to the deciding receive and decode the second packet out of sequence.

12. The wireless communications apparatus of claim 10, wherein the instructions related to the determining decode a High Speed Shared Control Channel of the second packet.

13. The wireless communications apparatus of claim 10, wherein the instructions related to the adjusting further adjust the reordering release timer value based on a minimum Inter Transmission Time Interval and a parameter signaled through a Radio Resource Configuration message.

14. The wireless communications apparatus of claim 10, wherein the instructions related to the releasing further release the second packet immediately or substantially immediately if the reordering release timer value is less than or equal to zero.

15. The wireless communications apparatus of claim 10, wherein the instructions related to the adjusting adjust the reordering release timer value for identified radio bearers.

16. A wireless communications apparatus, comprising:
   means for ascertaining that a first packet has not been successfully received;
   means for adjusting a reordering release timer value as a function of a transmission attempt number needed to a decode a second packet;
   means for calculating a new timer value based on at least the transmission attempt number; and
   means for selectively conveying the second packet based on the new timer value at least including means for waiting for expiration of the new timer value to convey the second packet if the new timer value is greater than zero.

17. The wireless communications apparatus of claim 16, wherein the means for ascertaining includes means for determining the second packet was received out of order based on an ordering sequence.

18. The wireless communications apparatus of claim 16, wherein the means for selectively conveying includes means for sending the second packet immediately or substantially immediately if the new timer value is less than or equal to zero.

19. The wireless communications apparatus of claim 16, wherein the means for adjusting includes means for determining the transmission attempt number for the second packet based on a High Speed Shared Control Channel decode information of the second packet.

20. The wireless communications apparatus of claim 16, wherein the means for calculating includes means for evaluating a parameter signaled by a network to calculate the new timer value, wherein the parameter is signaled through a Radio Resource Configuration message.

21. A computer program product, comprising:
   a non-transitory computer-readable medium comprising:
      a first set of codes for causing a computer to determine that a first packet was not received including causing the computer to receive and decode a second packet;
      a second set of codes for causing the computer to ascertain a transmission attempt number for the second packet;
      a third set of codes for causing the computer to calculate a reordering release timer value as a function of a minimum Inter Transmission Time Interval, a parameter signaled through a Radio Resource Configuration message, and the transmission attempt number; and
      a fourth set of codes for causing the computer to release the second packet to upper layers based on the reordering release timer value at least comprising releasing the second packet after expiration of the reordering release timer if the reordering release timer value is greater than zero.

22. The computer program product of claim 21, wherein the fourth set of codes releases the second packet immediately or substantially immediately if the reordering release timer value is less than or equal to zero.

23. At least one processor, comprising:
   a first module that ascertains that a first packet has not been successfully received based on receipt of a second packet, wherein the first module further determines the receipt of the second packet was out of order based on an ordering sequence;
   a second module that adjusts a reordering release timer value as a function of a transmission attempt number the second packet decoded;
   a third module that calculates a new timer value based on at least the transmission attempt number; and
   a fourth module that conveys the second packet based on the new timer value at least including waiting for expiration of the new timer value to convey the second packet if the new timer value is greater than zero.

* * * * *